United States Patent [19]

O'Neil et al.

[11] Patent Number: 5,171,164
[45] Date of Patent: Dec. 15, 1992

[54] QUICK-CONNECT FITTING FOR ELECTRICAL JUNCTION BOX

[75] Inventors: Daniel J. O'Neil, Moscow; Thomas J. Gretz, Clarks Summit, both of Pa.; Thomas S. Stark, Coral Springs, Fla.

[73] Assignee: Arlington Industries, Inc., Scranton, Pa.

[21] Appl. No.: 802,368

[22] Filed: Dec. 4, 1991

[51] Int. Cl.⁵ .............................................. H01R 13/79
[52] U.S. Cl. ..................................... 439/552; 29/868; 174/65 R
[58] Field of Search .................... 439/95, 58, 101, 552; 174/65 R; 285/158, 162; 29/868

[56] References Cited

U.S. PATENT DOCUMENTS 1,725,883  8/1929  Recker ................................. 285/162
2,518,426  8/1950  Kinander ........................ 285/158 X

*Primary Examiner*—Eugene F. Desmond
*Attorney, Agent, or Firm*—Auzville Jackson, Jr.

[57] ABSTRACT

A spring steel adaptor (20) that improves the ease of use and reduces the time involved in securing electrical connectors to electrical junction boxes (34). Several embodiments are disclosed which require the use of a zinc die-cast connector (26) having a smooth central section (32) to accommodate the spring steel adaptor (20). A separate embodiment employs a spring steel adaptor (20) that is designed to be used in conjunction with any of the standard size threaded electrical connectors that are presently in use in the electrical industry.

15 Claims, 7 Drawing Sheets

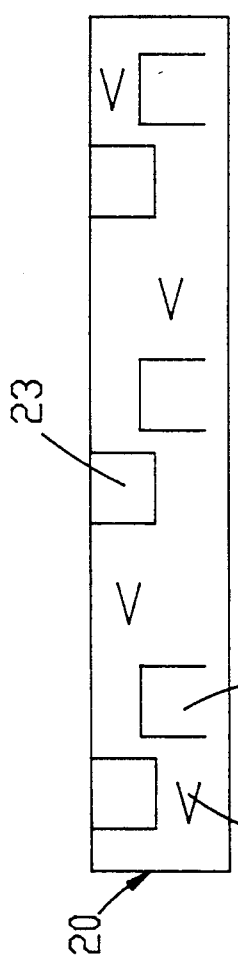
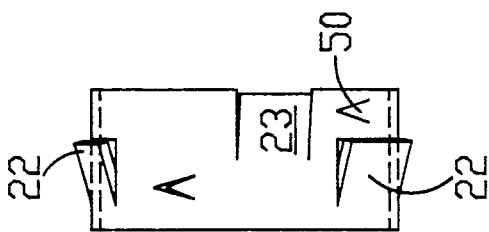
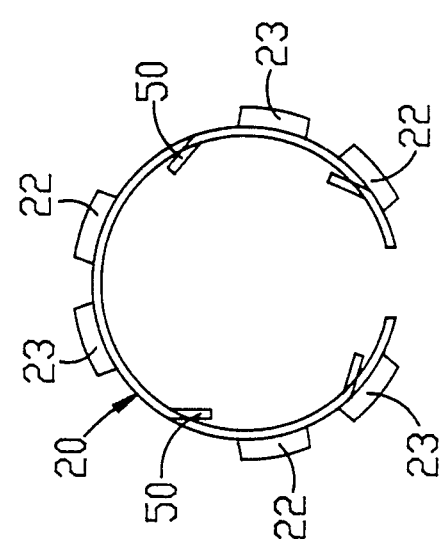
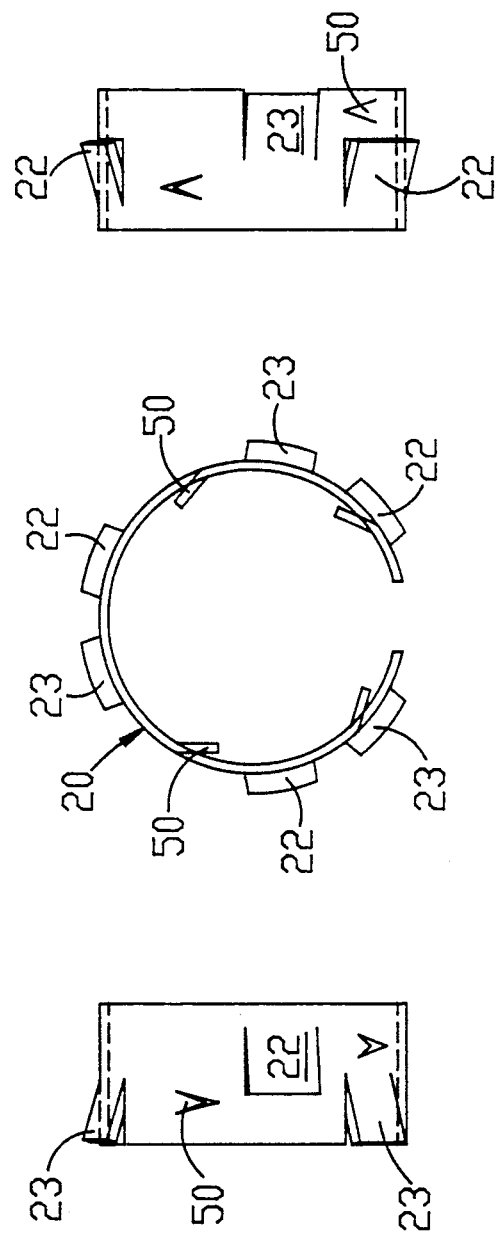
FIG. 10
FIG. 11
FIG. 12
FIG. 13

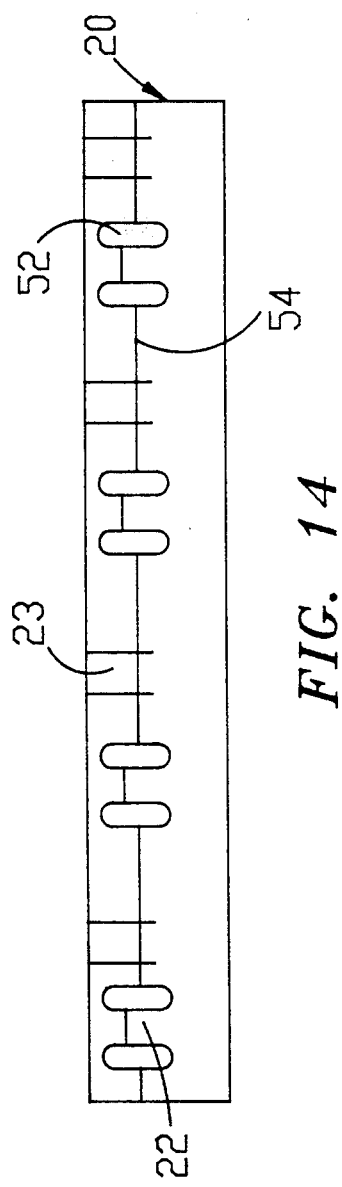
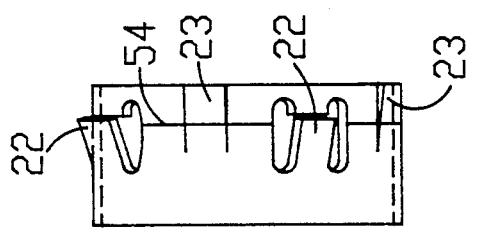
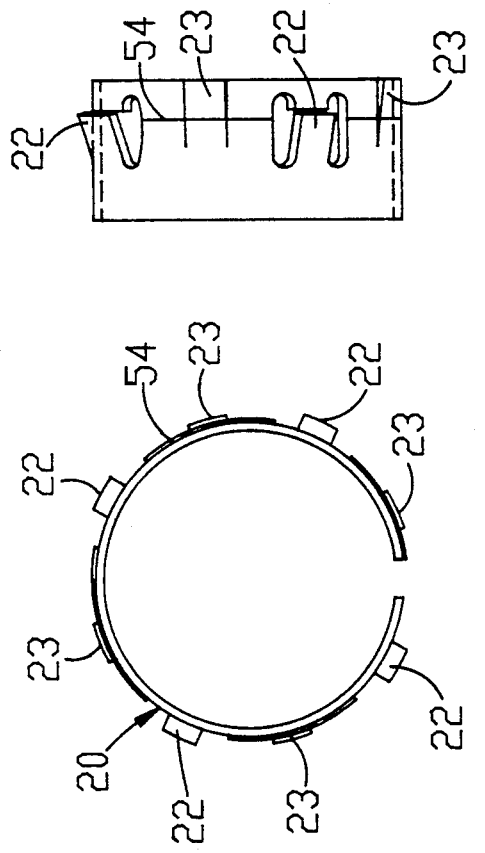
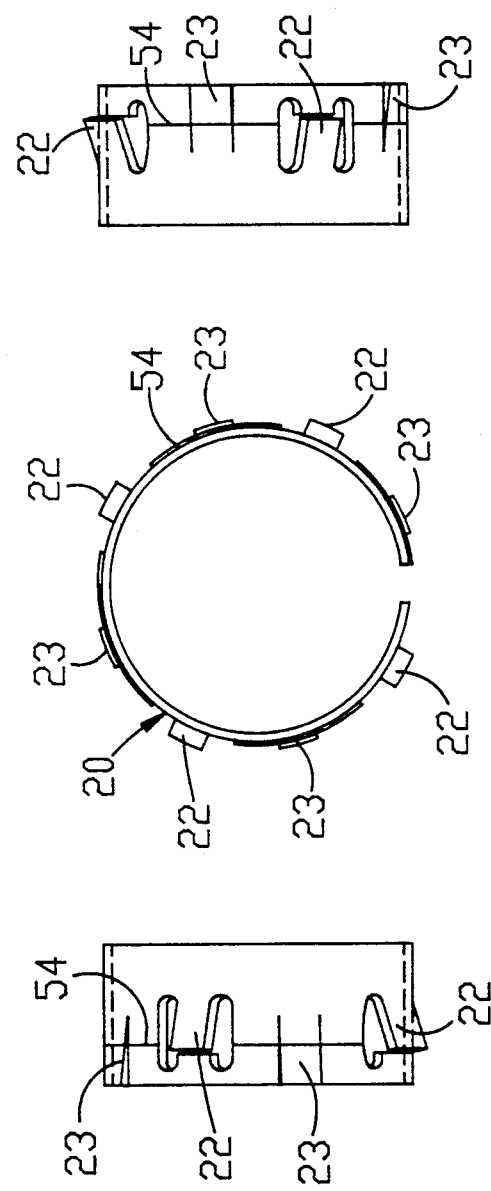

QUICK-CONNECT FITTING FOR ELECTRICAL JUNCTION BOX

BACKGROUND

1. Field Of Invention

This invention relates to connectors for electrical junction boxes, specifically to an improved connector that can be easily attached to an anchored junction box by pushing with one hand.

2. Description Of Prior Art

Heretofore, the most common form of attaching cable and electrical metal tubing (EMT) to electrical junction boxes is by the use of an interior-threaded lock nut which is screwed onto the exterior-threaded electrical fitting that extends into the junction box.

The disadvantage of the common threaded type of electrical connector is that it requires the use of both hands to secure it in place in the junction box. The flexible cable or EMT with the connector attached must be held in one hand while the threaded lock nut is held in the other hand, matched up to the threaded barrel of the connector, and then turned clockwise with respect to the connector until the lock nut is secured tightly to the connector. Matching the threaded lock nut to the connector can be very difficult, especially when the electrical junction box is in a location that is difficult to reach, such as a junction box for an overhead light fixture. In situations such as this, when it is difficult to see or to reach the junction box, it is very difficult to match up the connector and the lock nut and start the lock nut on the connector.

OBJECTS AND ADVANTAGES

Accordingly, several objects and advantages of this invention are:

(a) to make it easy to insert electrical connectors into electrical junction boxes, with the use of one hand instead of two;

(b) to reduce the time involved to connect the electrical connector to the junction box; and (c) to provide good electrical continuity, or ground, between the electrical connector, the junction box and the electrical source leading to the box as an integral part of the design of the connector.

DRAWING FIGURES

FIG. 10 is a laid out view of a third embodiment of this invention showing a spring steel adaptor before the tangs are lanced and pressed out and before the adaptor is formed into a circle.

FIG. 11 is a side view of the same third embodiment shown in FIG. 10, after being formed into a circular shape.

FIG. 12 is a plan view of the same third embodiment shown in FIG. 11.

FIG. 13 is a side view of the third embodiment, with this view showing the spring steel adaptor of FIG. 10 rotated 180 degrees from the view shown in FIG. 11.

FIG. 14 is a laid out view of the fourth and preferred embodiment of this invention showing a spring steel adaptor before the tangs are lanced and pressed out and before the adaptor is formed into a circular shape.

FIG. 15 is a side view of the same preferred embodiment shown in FIG. 14, after being formed into a circular shape.

FIG. 16 is a plan view of the same preferred embodiment shown in FIG. 15.

FIG. 17 is a side view of the fourth and preferred embodiment, with this view showing the spring steel adaptor of FIG. 14 rotated 180 degrees from the view shown in FIG. 15.

Figure 1:
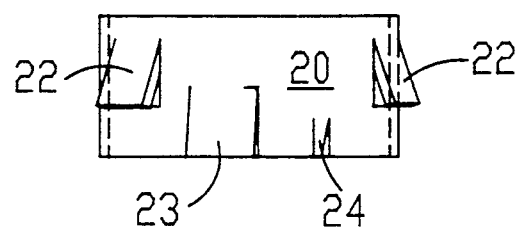
FIG. 1 shows a side view of the first embodiment of this invention, a spring steel adaptor. It includes a view of the outward-bent locking tang and the inward-bent tensioner tang.

REFERENCE NUMERALS IN DRAWINGS 20 spring steel adaptor
22 outward-bent locking tang
23 outward-bent tensioner tang
24 inward-bent tensioner tang
26 zinc die-cast connector
28 flange
30 raised shoulder
32 smooth central section or intermediate body of connector
34 electrical junction box
36 hole in electrical junction box to accommodate connector
38 wall of electrical junction box
40 outward-bent locking tang at narrowest depth from edge
42 outward-bent locking tang at second depth from edge
44 outward-bent locking tang at third depth from edge
46 outward-bent locking tang at fourth depth from edge
48 outward-bent locking tang at widest depth from edge
50 inward-bent tensioner/threading tang
52 oval-shaped slots
54 ridge

DESCRIPTION—FIGS. 1 TO 9

A side view of a portion of the first embodiment is shown in FIG. 1. A typical spring steel adaptor 20 is shown, including the outward-bent locking tangs 22, an outward-bent tensioner tang 23, and an inward-bent tensioner tang 24. The spring steel adaptor 20 is typically 0.024 inches thick and formed from spring steel such as SAE 1095 tempered spring steel or its equivalent. The adaptor has a leading end, trailing end and intermediate body between the ends. The leading end is the upper end in FIG. 1.

Figure 2:
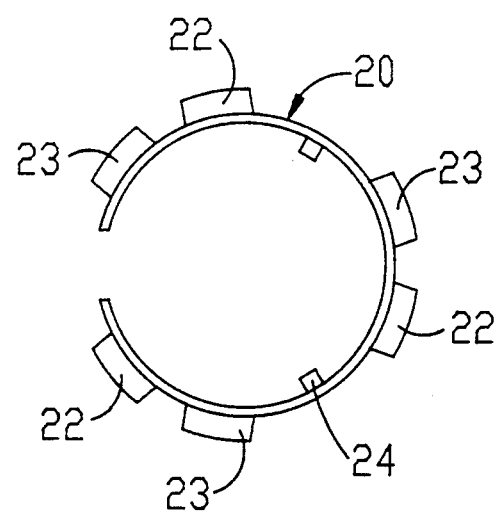
FIG. 2 is a plan view of the spring steel adaptor of FIG. 1, showing the location of the outward-bent locking tangs and inward-bent tensioner tangs.

A plan view of the spring steel adaptor 20 is shown in FIG. 2. The preferred embodiment contains three outward-bent locking tangs 22, three outward-bent tensioner tangs 23 and two inward-bent tensioner tangs 24. The three outward-bent tensioner tangs 23 are formed flush with one edge of the spring steel adaptor 20 and are spaced typically 120 degrees apart around the outside circumference of the adaptor 20. The circular metal spring adaptor 20 has an opening that results from not forming a complete circle. When the outward-bent tangs or spring locking members are bent inward to permit the adaptor to be inserted in a hole, there is also a slight reduction in the diameter by the opening narrowing, therefore, there are two spring actions involved during insertion.

The three outward-bent locking tangs 22 are formed in the center section of the adaptor 20 as shown in FIG. 1. These three tangs are offset typically 40 degrees from the flush outward-bent tensioner tangs 23, and are typically spaced 120 degrees apart around the outside circumference of the adaptor.

Two inward-bent tensioner tangs 24 are shown on the inside circumference of the steel spring adaptor 20 shown in FIG. 2. These tangs are typically spaced 140 degrees apart.

Figure 3:
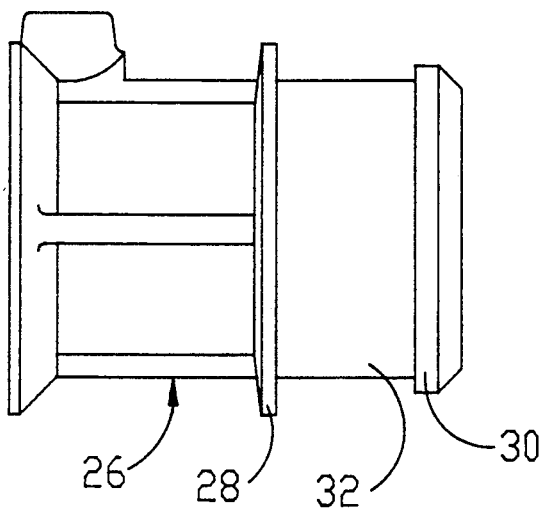
FIG. 3 is a side view of the electrical connector that the spring steel adaptor of FIG. 1 is used with, including the smooth central section without the spring steel adaptor.

FIG. 3 illustrates the zinc die-cast connector 26 including the smooth central section or intermediate body 32 that will accommodate the spring steel adaptor 20. The spring steel adaptor 20 will be held in place on the zinc die-cast connector 26 by the flange 28 and raised shoulder 30. The flange also serves to limit the insertion of the connector in a junction box hole. The connector shown is similar to a standard connector and can be of any suitable shape or design. There are approximately 30 different standard connectors.

Figure 4:
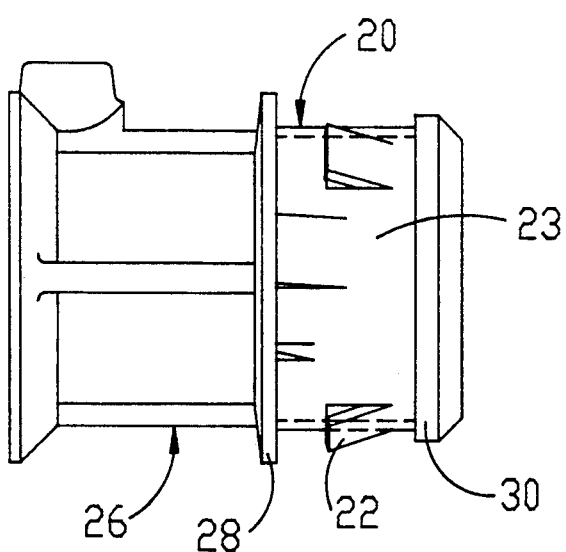
FIG. 4 shows a side view of the connector in FIG. 3 with the spring steel adaptor of FIG. 1 attached to the connector.

FIG. 4 illustrates a view of the zinc die-cast connector 26 with the spring steel adaptor 20 attached. The flange 28 is the trailing end and raised shoulder 30 with bevel is the leading end. They are shown holding the spring steel adaptor in place.

Figure 5:
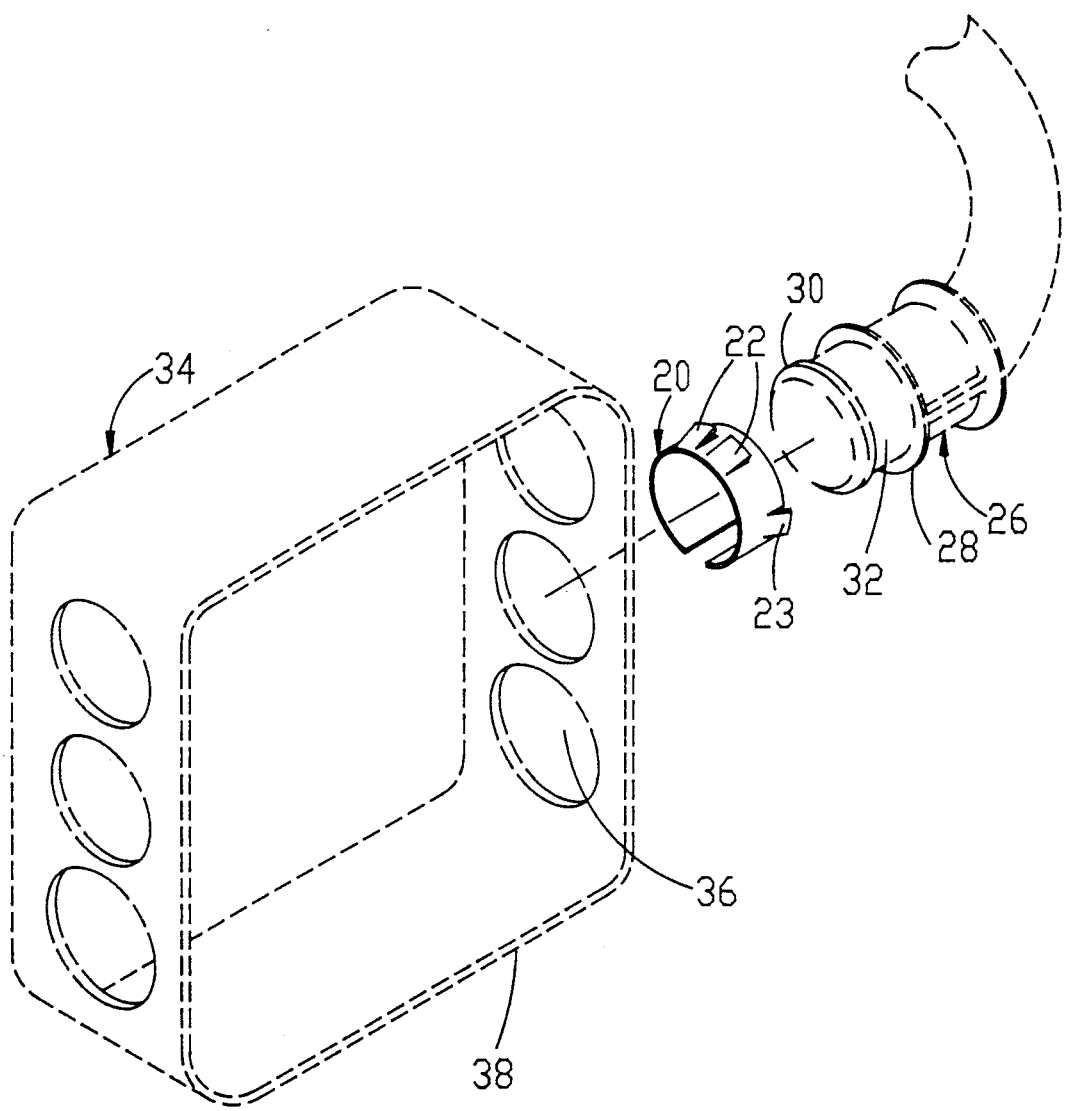
FIG. 5 is a broken away view of a typical electrical junction box, showing the connector of FIG. 3, including the smooth central section and the raised shoulder which will accommodate the spring steel adaptor. The spring steel adaptor of FIG. 1 is also depicted.

A broken away view showing a typical electrical junction box 34 with the zinc die-cast connector 26 is shown in FIG. 5. The smooth central section 32, the flange 28, and raised shoulder 30 of the connector 26 are depicted. A typical hole in the electrical junction box to accommodate the connector 36 is shown in the wall of the electrical junction box 38. The spring steel adaptor 20 is shown detached from the zinc die-cast connector 26 but centered around the axis on which it will be guided onto the connector. An outward-bent tensioner tang 23 and two outward-bent locking tangs 22 are annotated on this drawing.

Figure 6:
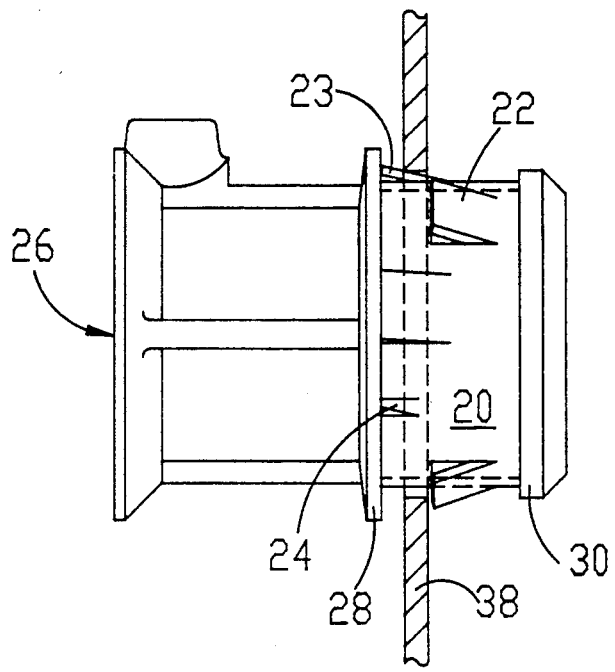
FIG. 6 shows the wall of a typical electrical junction box including the connector of FIG. 3 with the spring steel adaptor of FIG. 1 inserted. It depicts the outward-bent tangs depressed to tighten the connector and maintain electrical continuity.

FIG. 6 depicts the wall of the junction box 38 showing the zinc die-cast connector 26 with the spring steel adaptor 20 of the first embodiment inserted. The connector 26 is locked in place by the outward-bent locking tangs 22. The drawing depicts the outward-bent tensioner tangs 23 under tension. The flange 28, the raised shoulder 30, the outward-bent locking tangs 22, the outward-bent tensioner tangs 23, and an inward-bent tensioner tang 24 are all shown in relationship to the wall of the electrical junction box 38.

Figure 7:
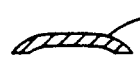
FIG. 7 is a detail drawing of a typical tang of the spring steel adaptor shown in FIG. 1.

A detail drawing of a tang is shown in FIG. 7. The outward-bent locking tangs 22 and the outward-bent tensioner tangs 23 of this first embodiment are typically bent out to a 0.936 inch diameter. Inward-bent tensioner tangs 24 are typically bent in to a 0.695 inch diameter.

Figure 8:
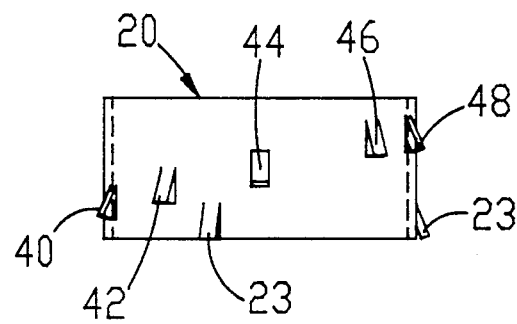
FIG. 8 shows a side view of a second embodiment, a spring steel adaptor with thirteen outward-bent tangs instead of 6, as in the preferred embodiment.

FIG. 8 is a side view of a second embodiment of this invention. It depicts five of the ten outward-bent locking tangs that are arranged at various locations on the circumference of the spring steel adaptor 20. From left to right in FIG. 8, there is depicted an outward-bent locking tang at the narrowest depth 40, an outward-bent locking tang at the second depth 42, an outward-bent locking tang at the third depth 44, an outward-bent locking tang at the fourth depth 46, and an outward-bent locking tang at the widest depth 48. As shown in the drawing, the outward-bent tensioner tangs 23 are formed flush with the side of the spring steel adaptor 20.

Figure 9:
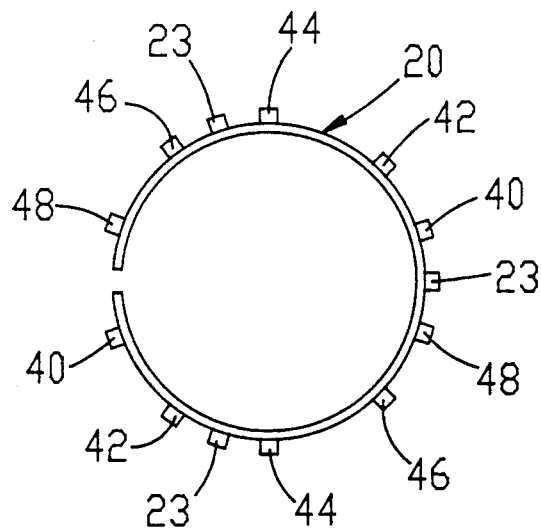
FIG. 9 is a plan view of the second embodiment shown in FIG. 8.

FIG. 9 depicts a plan view of the second embodiment showing the spring steel adaptor 20 with ten outward-bent locking tangs instead of 6 as in the first embodiment. Three outward-bent tensioner tangs 23 are located flush with one edge of the spring steel adaptor 20 and are spaced 120 degrees apart along its outer circumference. Two outward-bent locking tangs at the narrowest depth 40 are located approximately 180 degrees apart along the circumference of the adaptor. Likewise, two outward-bent locking tangs at the second depth 42, two outward-bent locking tangs at the third depth 44, two outward-bent locking tangs at the fourth depth 46, and two outward-bent locking tangs at the widest depth 48 are each respectively located approximately 180 degrees apart from their same numbered complement around the outer circumference of the spring steel adaptor 20.

FIG. 10 depicts a laid-out view of a third embodiment showing a spring steel adaptor 20 before the tangs are lanced and pressed out and before being formed into a circular shape. Depictions are made in the drawing to show where the outward-bent tensioner tangs 23, the outward-bent locking tangs 22 and the inward-bent tensioner/threading tangs 50 will be lanced out.

In FIG. 11, a side view of the spring steel adaptor 20 of FIG. 10 is shown, after being formed into a circle. Two outward-bent tensioner tangs 23, an outward-bent locking tang 22 and an inward-bent tensioner/threading tang 50 are depicted.

FIG. 12 gives a plan view of the third embodiment. The three outward-bent tensioner tangs 23 are located approximately 120 degrees apart on the outer circumference of the spring steel adaptor 20. The three outward-bent locking tangs 22 are also spaced typically 120 degrees apart on the outer circumference of the spring steel adaptor 20. The outward-bent locking tangs 22 are offset typically 40 degrees from the outward-bent tensioner tangs 23.

Four inward-bent tensioner/threading tangs 50 are depicted in FIG. 12 along the inner circumference of the spring steel adaptor 20.

Two inward-bent tensioner/threading tangs 50 are shown spaced at different distances from the edge of the spring steel adaptor 20 in FIG. 13.

FIG. 14 depicts a laid-out view of the fourth and preferred embodiment of this invention, a spring steel adaptor 20 containing oval-shaped slots 52. The slots are cut in the spring steel adaptor 20 to form the edges of the outward-bent locking tangs 22.

FIG. 14 also depicts a ridge 54 formed along the length of the laid-out spring steel adaptor 22. Four outward-bent tensioner tangs 23 are also annotated in the drawing.

The spring steel adaptor 20 of the preferred embodiment is shown formed into a circular shape in FIG. 15. This is a side view of the adaptor showing two outward-bent tensioner tangs 23 and two outward-bent locking tangs 22.

FIG. 16 is a plan view of the adaptor of the preferred embodiment. As shown in the plan view, four outward-bent locking tangs 22 are located typically so degrees apart around the outer circumference of the spring steel adaptor 20. Four outward-bent tensioner tangs 23, spaced typically 90 degrees apart, are also depicted. The outward-bent tensioner tangs 23 and the outward-bent locking tangs are offset typically 45 degrees from each other around the outer circumference of the spring steel adaptor 20.

FIG. 17 shows another side view of the fourth and preferred embodiment. Two outward-bent tensioner tangs 23 and two outward-bent locking tangs 22 are depicted in this view.

OPERATION—FIGS. 3, 4, 6, 8, TO 17

All the embodiments of this invention are used to connect electrical metal tubing or cable to electrical junction boxes.

The first embodiment, shown in FIG. 4, is comprised of an electrical connector with a spring steel adaptor pressed onto its smooth central section, such as shown in FIG. 4. The spring steel adaptor 20 typically has an outer diameter of 0.845 inches in its relaxed state. A slight force is required to push the spring steel adaptor 20 over the raised shoulder 30 which is typically 0.848 inches in diameter. The raised shoulder 30 is beveled from 0.848 inches to 0.750 inches to allow the spring steel adaptor 20 to easily center on the connector and to slip over the shoulder when lt is pressed onto it. The adaptor, typically 0.375 inches in width, fits easily into the 0.380 inch space between the raised shoulder 30 and the flange 28 of the zinc die-cast connector 26

The electrical connector with adaptor is first secured to the EMT or cable by tightening a set screw. As shown in FIG. 5, the electrical connector 26 is then simply attached to the wall of the electrical junction box 34 by pushing the connector into the box until the flange 28 contacts the wall 38. The connector 26 enters the electrical junction box 34 easily as the raised shoulder 30 is beveled from a diameter of 0.848 inches to a diameter of 0.750 inches on the side that will first enter the electrical junction box 34. The diameter of the standard hole in the electrical junction box to accommodate the connector 36 is 0.875 inches. Therefore the zinc die-cast connector 26 at a 0.750 inch diameter on the beveled edge easily enters the opening which has a 0.875 inch diameter.

Some force is required to push the remainder of the electrical connector of the first embodiment into the junction box, as the outer circumference of the adaptor 20 including the outward-bent locking tangs 22 is typically 0.936 inches. The outward-bent locking tangs 22 must therefore be depressed to the diameter of the opening, 0.875 inches, before passing through. With the leverage provided by the cable or EMT connected to the opposite end of the connector, the connector will easily enter the junction box.

When the flange 28 contacts the wall of the electrical junction box 34 as shown in FIG. 6, the three outward-bent locking tangs 22 snap outward and prevent the connector from slipping out of the box. Typical wall thickness of a standard electrical junction box 34 is 0.070 inches. In this first embodiment, the distance from the outward-bent locking tangs 22 to the edge of the adaptor is typically 0.135 inches.

After the connector is pushed in completely, the three outward-bent tensioner tangs 23 exert force on the exterior wall of the electrical junction box 38, keeping the connector under tension and firmly in place against the wall. The diameter of the spring steel adaptor 20 inside the inward-bent tensioner tangs 24 is typically 0.695 inches, which is smaller than the 0.735 inch diameter of the smooth central section of the connector 32. This insures that good contact will be obtained between the spring steel adaptor 20 and the connector 26 when the connector is pushed into the junction box.

The outward-bent tensioner tangs 23 provide electrical continuity or ground between the spring steel adaptor 20 and the wall of the electrical junction box 38 by keeping the two in firm contact. In addition, the inward-bent tensioner tangs 24 provide electrical continuity between the zinc die-cast connector 26 and the spring steel adaptor 20 by keeping tension at two points of contact between the two.

The second embodiment of this invention provides the same function as the preferred embodiment but is designed to connect EMT or cable to electrical junction boxes of different wall thicknesses. As shown in FIG. 8, five outward-bent locking tangs 40, 42, 44, 46 and 48, are arranged at various distances from the edge of the spring steel adaptor 20. As shown in FIG. 9, another five outward-bent locking tangs 40, 42, 44, 46, and 48 are arranged at the same distances from the edge of the spring steel adaptor 20 with the relationship that the outward-bent locking tangs that are 180 degrees apart are at the same distance from the edge.

Thus, two outward-bent locking tangs at the narrowest depth 40 are located typically 180 degrees apart on the circumference of the adaptor of the second embodiment and are typically 0.101 inches from its edge. These two tangs would hold the connector in place for electrical junction boxes of widths less than typically 0.096 inches.

The two outward-bent locking tangs at the second depth 42 are located typically 0.132 inches from the edge of the adaptor. The two outward-bent locking tangs at the third depth 44 are located typically 0.166 inches from the edge of the adaptor. The two outward-bent locking tangs at the fourth depth 46 are located typically 0.196 inches from the edge of the adaptor. The two outward-bent locking tangs at the widest depth 48 are located typically 0.225 inches from the edge of the adaptor. As the wall thickness of electrical junction boxes increases, the higher numbered outward-bent locking tangs are progressively employed as needed to lock the connector in place.

In operation, if the adaptor shown in FIGS. 8 and 9 is inserted into an electrical junction box, the adaptor will slide into the box until the flange contacts the wall of the junction box. At that time, all the outward-bent locking tangs that have passed through the wall of the junction box will snap outward. The two outward-bent locking tangs that have snapped out and are closest to the wall of the function box will prevent the connector from backing out of the junction box. All of the outward-bent locking tangs that have not passed through the wall of the junction box will become tensioner tangs and provide tension and electrical continuity between the spring steel adaptor 20 and the electrical junction box.

The third embodiment of this invention is shown in FIG. 10. This embodiment is a spring steel adaptor that is designed to be used with a number of existing threaded electrical connectors that are in common use in the electrical industry today. FIG. 10 depicts a laid-out view of the third embodiment showing a spring steel adaptor 20 before the tangs are lanced and pressed out and before being formed into a circular shape.

As shown in the drawing, the outward-bent tensioner tangs 23 and the outward-bent locking tangs 22 are similar to those employed in the first and second embodiments of this invention. The distinguishing difference with this embodiment is the use of inward-bent tensioner/threading tangs 50 that will be lanced and pressed inward to provide a means of threading this adaptor onto the properly sized threaded electrical connector.

After being formed into a circular shape, the inside diameter of the spring steel adaptor 20 of FIGS. 11, 12 and 13 is typically 0.782 inches. Both the outward-bent locking tangs 22 and the outward-bent tensioner tangs 23 are pressed outward to an outer diameter of 0.936 inches. The four inward-bent tensioner/threading tangs 50 are pressed inward to form a typical inner diameter for the spring steel adaptor 20 of 0.695 inches.

As shown in FIG. 10 in the laid-out view, the inward-bent tensioner/threading tangs are staggered in the distance from the edge to permit the tangs to follow the thread of the electrical connector that it will be threaded on. From right to left in FIG. 10, the inward-bent tensioner/threading tangs are located from the top edge of the spring steel adaptor 20 typically 0.060 inches, 0.103 inches, 0.220 inches and 0.263 inches. The tangs at 0.060 and 0.103 inches will start the adaptor on the threaded electrical connector when used. The tangs at 0.220 and 0.263 inches will follow onto the threads of the electrical connector as it is screwed further on and provide a positive means of threading and locking the adaptor onto the threaded end of the connector.

After threaded onto the connector the adaptor of the third embodiment will be screwed in until the adaptor is tightened onto the connector. The electrical connector with the adaptor attached can then be easily inserted into an electrical junction box having a typical 0.070 inch wall thickness.

The fourth and preferred embodiment is shown in FIGS. 14, 15, 16 and 17. This embodiment is designed to be pressed onto an electrical connector such as that shown in FIG. 3 and described in the operation section under embodiment 1.

This embodiment is similar to the first embodiment in function as it will be pressed onto the smooth central section of the connector shown in FIG. 3. It is an improvement over embodiment 1 in that less force is required to insert the fourth and preferred embodiment into an electrical junction box.

Less force is required to insert the fourth embodiment into a junction box as a result of the oval-shaped slots 52 depicted in FIG. 14. These oval-shaped slots 52 are punched out of the spring steel adaptor 20 prior to pressing out the outward-bent locking tangs 22. By removing the oval-shaped slots 52 of the spring steel adaptor 20, less force is then required to push the connector with adaptor into the electrical junction box.

An oval-shaped slot 52 forms each side of the outward-bent locking tangs 22. By having this portion of the spring steel adaptor removed, the outward-bent locking tangs 22 spring back and forth more freely, as there is no metal to metal contact when the tang is force inward.

A ridge 54 is pressed into the spring steel adaptor 2.0 along its length as shown in FIG. 14. The ridge 54 improves the springing action of the outward-bent tensioner tangs 23 and thereby improves the electrical continuity between the adaptor and the electrical junction box. The ridge 54 is typically pressed out to an outer diameter of 0.875 inches.

The spring steel adaptor 20 of FIG. 16 is typically 0.838 inches in outer diameter measured across the flat surface of the spring. Across its diameter from one outward-bent tensioner tang 23 to another, the spring typically measures 0.910 inches. The outer diameter of the spring measured across the outward-bent locking tangs 22 is typically 0.950 inches.

As the spring steel adaptor 20 of the fourth and preferred embodiment is inserted into a junction box, the outward-bent locking tangs 22, at a 0.950 inch diameter, spring inward as they are forced into the 0.875 inch typical opening in the junction box. The outward-bent locking tangs 22 then spring outward again to their at rest position after being pushed past the wall of the junction box. Springing action of the tangs occurs very easily as the oval-shaped slots 52 eliminate metal to metal contact of the tangs with the spring body.

After the outward-bent locking tangs 22 are locked in place, the outward-bent tensioner tangs 23, at 0.910 inch diameter, exert tension between the spring steel adaptor 20 and the inner circumference of the opening in the electrical junction box. The ridge, at 0.875 inch outer diameter, also exerts force on the inner circumference of the opening in the electrical junction box and improves the electrical continuity between the adaptor and the junction box.

SUMMARY, RAMIFICATIONS AND SCOPE

Accordingly, the quick connect fitting of this invention makes it easier to connect cable or EMT to electrical junction boxes. By using this invention, the amount of time required to connect cable or EMT to electrical junction boxes is reduced. Furthermore, the invention provides good electrical continuity or ground between the electrical connector, the junction box, and the source leading to the box as an integral part of the design of the connector.

A second embodiment of this invention performs the same function as the preferred embodiment but enables connection to electrical junction boxes with various wall thicknesses.

Although the description above contains many specificities, these should not be construed as limiting the scope of the invention but as merely providing illustrations of some of the preferred embodiments of this invention, For example, the spring steel adaptor can have more tangs and the tangs can be of different dimensions.

Thus the scope of the invention should be determined by the appended claims and their legal equivalents, rather than by the examples given.

What is claimed is:

1. A quick connect fitting for an electrical junction box comprising:
   a hollow electrical connector through which an electrical conductor may be inserted having a leading end thereof for insertion in a hole in an electrical junction box;

a circular spring metal adaptor surrounding said leading end of said electrical connector which also has a leading end, a trailing end, and an intermediate body, said circular spring metal adaptor being less than a complete circle when on the electrical connector and when separated from said electrical connector has a relaxed diameter, less than the diameter of the portion of the connector which it surrounds;

at least two spring locking members carried by said metal adaptor that spring inward to a retracted position to permit said adaptor and locking member to be inserted in a hole in an electrical junction box and spring outward to lock said electrical connector from being withdrawn through the hole; and an arrangement on said connector for limiting the distance said connector can be inserted into the hole in the junction box.

2. The quick connect fitting of claim 1 which further includes:

at least two outwardly sprung members carried by said metal adaptor near said trailing end of said adaptor which engage the side walls of the hole in the junction box into which said adaptor is inserted.

3. The quick connect fitting of claim 1 wherein:

said circular spring metal adaptor has an opening in the circumference of said circular spring metal adaptor that extends through the entire length which permits the said adaptor to be expanded to a larger diameter.

4. The quick connect fitting of claim 1 wherein said spring locking members are integral with and lanced out of said circular spring metal adaptor.

5. The quick connect fitting of claim 4 wherein said connector has a flange and shoulder with smooth intermediate portion there between with said adaptor carried on said intermediate portion and held in position by said flange and shoulder.

6. The quick connect fitting of claim 4 wherein there are a series of spring locking members spaced longitudinally along said adaptor so as to enable the adaptor to be inserted in a hole in an electrical junction box having different wall thicknesses.

7. The quick connect fitting of claim 6 wherein said connector has a flange and shoulder with smooth intermediate portion there between with said adaptor carried on said intermediate portion and held in position by said flange and shoulder.

8. The quick connect fitting of claim 1 wherein said connector has a flange and shoulder with intermediate portion there between with said adaptor carried on said intermediate portion and held in position by said flange and shoulder.

9. The quick connect fitting of claim 1 wherein said connector has a flange and shoulder with smooth intermediate portion there between with said adaptor carried on said intermediate portion and held in position by said flange and shoulder.

10. The quick connect fitting of claim 1 which further includes:

a series of inward-bent tensioner/threading tangs lanced from said circular spring adaptor that are staggered to coincide with threads on a standard electrical connector to permit the threading thereon of said adaptor.

11. The quick connect fitting of claim 10 wherein said tensioner/threading tangs are in the shape of triangles that dig in to resist the unthreading thereof.

12. A split circular spring metal adaptor for utilization with a standard hollow electrical connector for permitting a quick connect fitting of said connector in an electrical junction box with said connector having an arrangement for limiting the distance said connector can be inserted into the hole in the junction box comprising:

a split circular spring metal adaptor having a diameter smaller than a hole in an electrical junction box into which it is to be inserted; and a series of inward tensioner/threading tangs lanced from said adaptor that are staggered to coincide with threads on a standard electrical connector to permit the threading thereon of said adaptor.

13. The split circular spring metal adaptor of claim 11 wherein said tensioner/threading tangs are in the shape of triangles that dig in to resist the unthreading thereof.

14. A method for quickly connecting fittings to electrical junction boxes comprising:

providing an electrical junction box with a hole;

providing an electrical connector having a leading end for insertion in said hole;

providing a circular spring metal adaptor surrounding said leading end of said electrical connector with said spring metal adaptor having a divided circumference of less than a complete circle when placed on said electrical connector and when separated from said electrical connector having a relaxed diameter of less than the diameter of the portion of electrical connector which said adaptor surrounds;

providing at least two spring locking members on said spring metal adaptor that have a relaxed outer dimension greater than the diameter of said hole; and inserting said spring metal adaptor and electrical connector into said hole until said spring locking members have gone entirely through said hole and spring back to a locking position to prevent said adaptor and electrical connector from being withdrawn.

15. The method of claim 14 which further includes the steps of:

providing a threaded section on said electrical connector leading end;

providing inward-bent tensioner/threading tangs lanced from said adaptor that are staggered to coincide with the said threads; and threading said adaptor onto leading edge of said connector.

* * * * *